United States Patent [19]
Brookhart

[11] 3,989,789
[45] Nov. 2, 1976

[54] METHOD FOR MAKING A NON-RIGID LAMINAR CORE

[75] Inventor: Rex D. Brookhart, Mission Viejo, Calif.

[73] Assignee: de Lorme Marketing Corporation, Mission Viejo, Calif.

[22] Filed: Mar. 3, 1975

[21] Appl. No.: 554,760

[52] U.S. Cl. .............................. 264/136; 264/132; 264/134; 264/137; 264/258
[51] Int. Cl.² .......................................... B29D 7/22
[58] Field of Search ........... 264/129, 132, 134, 136, 264/137, 257, 258, 286, 287, 294; 156/201, 205, 208

[56] References Cited
UNITED STATES PATENTS

| | | | |
|---|---|---|---|
| 3,047,444 | 7/1962 | Harwood | 264/129 X |
| 3,077,000 | 2/1963 | Huisman | 264/286 X |
| 3,658,977 | 4/1972 | Baker | 264/130 |

*Primary Examiner*—Richard R. Kucia
*Attorney, Agent, or Firm*—Wm. Jacquet Gribble

[57] ABSTRACT

A woven cloth of flexible material is masked to expose only longitudinal spaced stripes. A plastic polymer is applied to the exposed material. The striped cloth is draped over spaced supports that are transverse to the stripes. Depressors are applied to the cloth between the supports so that the cloth is substantially sinusoidal in crosssection. The cloth is cured to harden the stripes so that the cloth is still flexible in one direction but only slightly flexible in the other. The cloth is warped, bent or otherwise shaped as desired for application to it of laminar sheets of cloth, metal or wood, then the core and the laminates are joined, impregnated and cured to a rigid structure of desired configuration and high strength to weight ratio.

5 Claims, 14 Drawing Figures

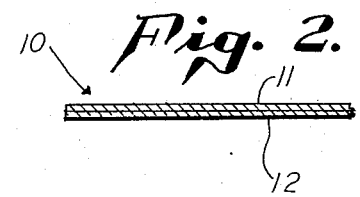
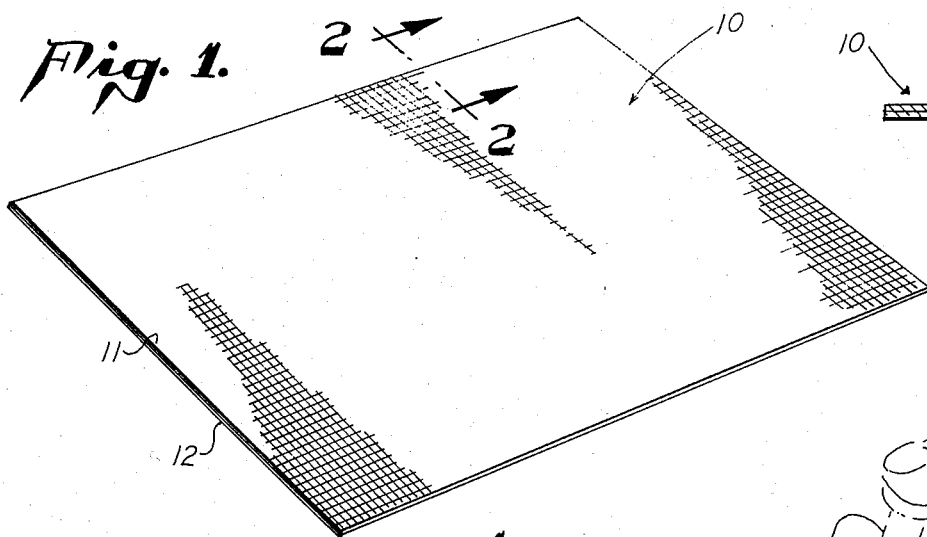
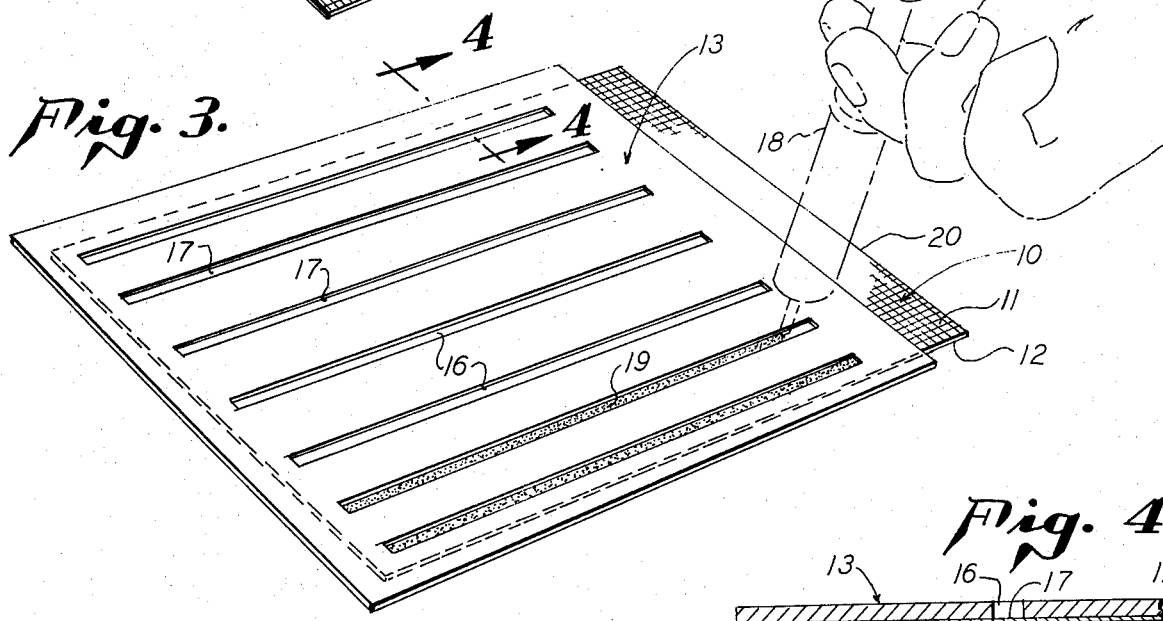
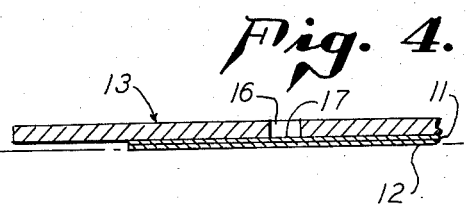
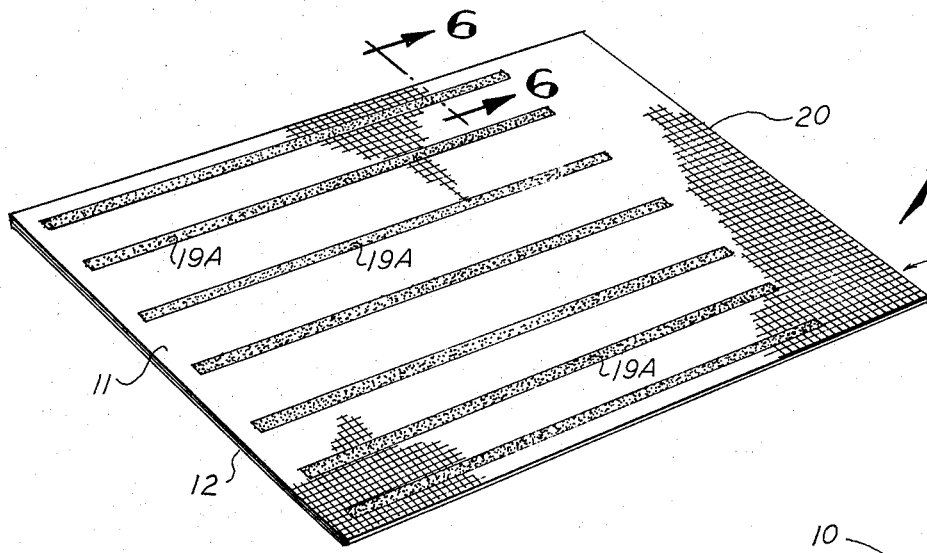
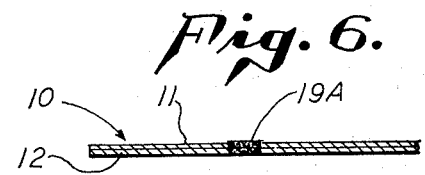

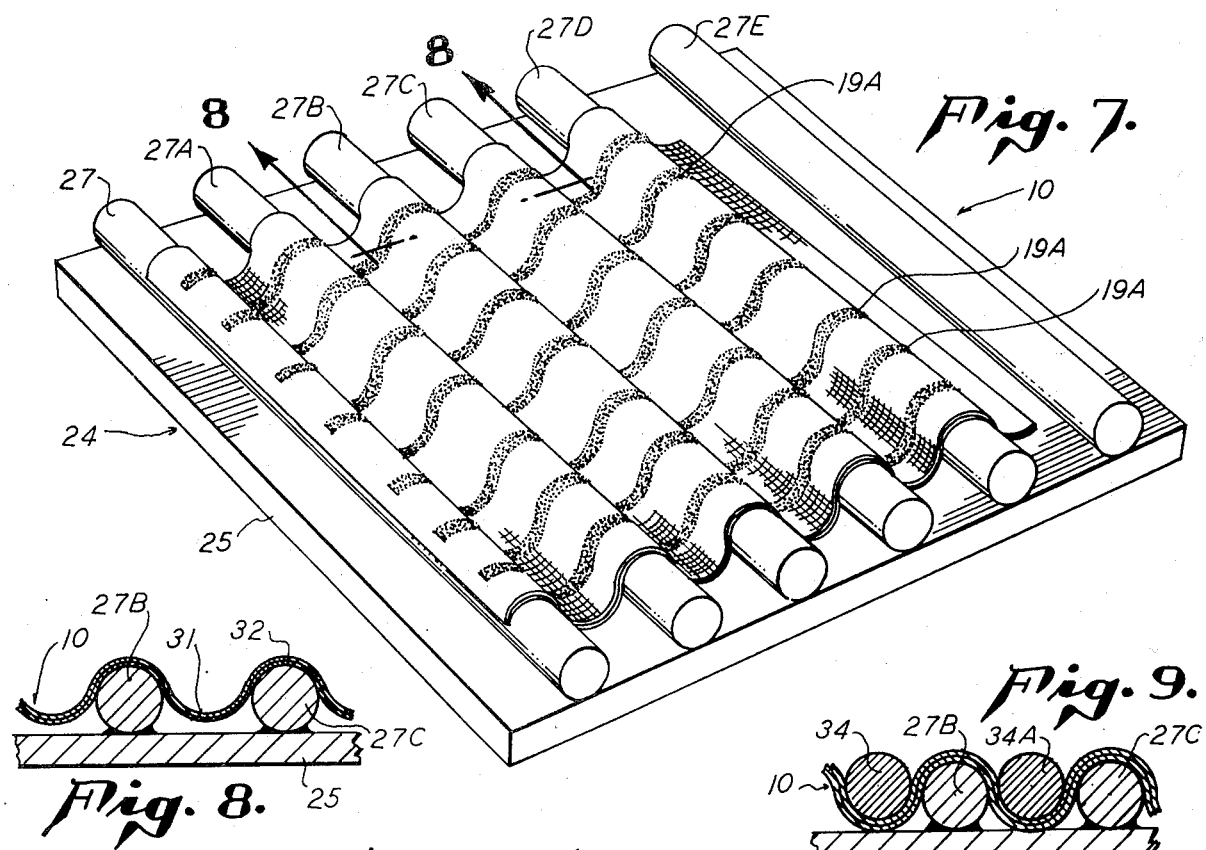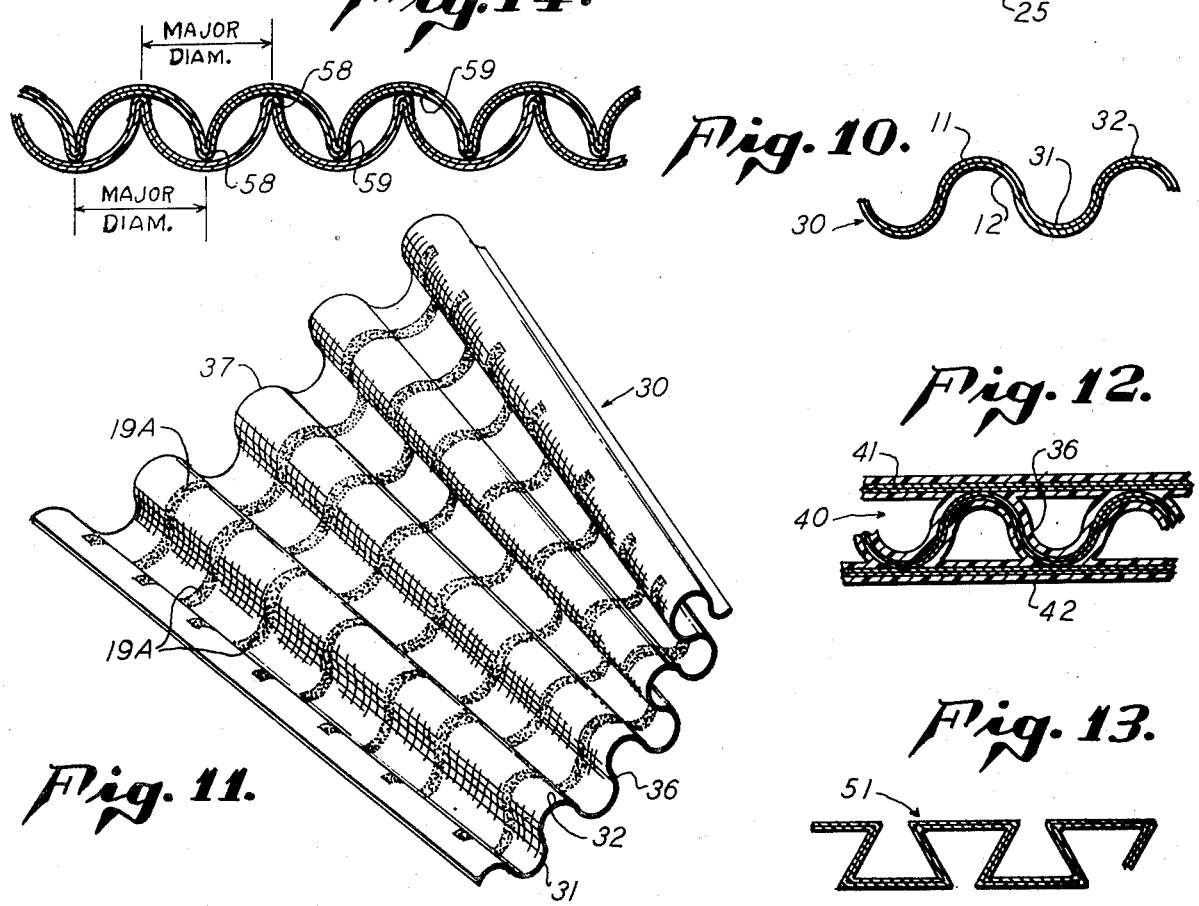

METHOD FOR MAKING A NON-RIGID LAMINAR CORE

BACKGROUND OF THE INVENTION

The invention relates to high strength, low weight laminar structures, and more particularly to corrugated, undulant or otherwise three-dimensional cores for such structures. Heretofore it has been known to take rigid corrugated substances and to form laminates therefrom by fixing sheets to the faces of the corrugated substance. Such structures have been limited in the configurations available because the cores of corrugated material of requisite strength have been fixed in their attitude and shape at the time the outer sheets are applied. I have invented cores and process and apparatus for making cores which afford a configurable core with great flexibility in one direction and limited flexibility in the other direction which is a stable three dimensional element after curing.

SUMMARY OF THE INVENTION

The process contemplates the steps of uniting two thicknesses of a conventional cloth or other impregnable sheet, for instance fiberglass, carbonate cloth or burlap, applying a mask to the surface of the united sheets and then impregnating the accessible cloth area through the mask with a polymer plastic which is hardenable by heat or time lapse. Preferably the two cloth layers are fixed together by the impregnant. The impregnated cloth or sheet is draped over spaced, parallel supports, and may be further shaped by depressing the cloth between supports. The impregnated cloth is then cured to obtain a three dimensional core having flexibility in a direction parallel to the supports and relative inflexibility transeversely of the supports. The core may then be shaped as desired and receive outer laminates which may be fixed to the core to achieve any one of a multitude of variously configured laminar structures of extreme strength, light weight and varied textures which may be further impregnated and then hardened.

The inventive core is a product of the process and may comprise an impregnable flexible cloth or sheet having spaced, parallel stripes of impregnant hardened in place, undulating parallel faces fixed in relative position by the hardened impregnant, and flexible about lines transverse to the impregnant stripes.

The configured core may have outer laminates fixed to it, with such laminates comprised of any material capable of being bonded to the core and of withstanding the rack or warp stress necessary to fit to the core shape desired. The whole or any part of the resulting three dimensional structure may be impregnated and cured to form a rigid panel, post or base element.

While plastic polymers such as polyurethane elastomer are preferred, the invention does not preclude the use of epoxies, vinyls, starches and cementitious materials in combination with industrial fabrics like glasscloth, carbon cloth, organic fiber, etc., in addition to the mentioned polyurethanes.

These and other advantages of the process, apparatus and product of the invention are apparent from the following detailed description and drawing.

BRIEF DESCRIPTION OF THE DRAWING

FIG. 1 is a perspective view of an industrial cloth for a core;

FIG. 2 is a sectional elevation taken along line 2 — of FIG. 1;

FIG. 3 is a perspective view showing the masking and striping steps of the process;

FIG. 4 is a fragmentary sectional elevation taken along line 4 — of FIG. 3;

FIG. 5 is a perspective view of an impregnated core sheet resulting from the steps of FIG. 3;

FIG. 6 is a fragmentary sectional elevation taken along line 6 — of FIG. 5;

FIG. 7 is a perspective view illustrating the forming of the core on the apparatus of the invention;

FIG. 8 is a fragmentary sectional elevation taken along line 8 — of FIG. 7;

FIG. 9 is a fragmentary sectional elevation similar to FIG. 8 showing depressors between supports;

FIG. 10 is a fragmentary sectional elevation of a shaped core resulting from the process;

FIG. 11 is a perspective view illustrating one of the degrees of flexibility of the three dimensional core of the invention;

FIG. 12 is a fragmentary sectional elevation of a core combined with exterior laminar members;

FIG. 13 is a fragmentary sectional elevation of an alternate embodiment of the inventive core; and FIG. 14 is a fragmentary sectional elevation of a further alternate embodiment of the inventive core.

In the various Figures like parts are given like numerals.

DESCRIPTION OF THE PREFERRED EMBODIMENTS

FIGS. 1 and 2 illustrate a laminar core blank 10 of two sheets 11, 12 of industrial woven cloth such as fiberglass or carbon cloth, or other cloths of high strength, permeability and flexibility. In FIG. 3 the blank 10 lies beneath a mask 13 having a plurality of longitudinal apertures 16 exposing divided areas 17 of the blank 10. While the blank and the mask are shown as relatively short compared to their widths, each may be elongate, or the cloth be from a continuous roll advanced incrementally beneath the mask.

An applicator gun 18 is shown in FIG. 3 exuding a plastic polymer 19 through the aperture to the cloth blank where the aperture exposes the cloth surface. The operation is repeated for each of the apertures of the mask. FIG. 4 illustrates the vertical relationship of mask and blank, with the width of the exposed area 17 clearly visible in that Figure.

After the application of the polymer the mask is separated from the blank, which now has a plurality of elongate parallel stripes 19A of polymer. These stripes may extend the full length of the blank or terminate short of the end 20 as shown in FIG. 5. It is preferred that sufficient polymer be applied to penetrate both sheets of the blank, as shown in FIG. 6, to aid in fixing the two sheets of the blank together.

It is obvious that in high volume production automatic equipment such as the conventional gluing guns may be used in batteries to replace the manually operated applicator of FIG. 3. In either instance the area exposed through the mask receives a plastic polymer stripe 19A, preferably a polyurethane elastomer such as Dupont's PDM 49, spaced about an inch apart.

As can be appreciated, the mask pattern may vary with the intended shape and applicators adjusted to adapt to stripes other than parallel and of uniform thickness.

After the hardenable polymer stripes are applied to and through the blank 10, the impregnated blank is draped on a forming apparatus 24 which comprises a base 25 with parallel spaced supports 27 – 27E fixed to the base. In the illustrative forming apparatus the supports are cylindrical, but the invention does not preclude use of other configurations to achieve corrugated cores of a desired cross-sectional configuration. Two such varying configurations are shown in FIGS. 13 and 14 to be further described later.

Depending upon the rigidity and the density of the material used for the core sheets, the blank tends to depend below the top plane of the support rods more or less as shown in FIG. 7 and FIG. 8. Note that the plastic polymer stripes run transversely to the support rods such that the stripe assumes an undulant or sinusoidal configuration imparting a three dimensional quality to the core sheet.

As can be seen from FIG. 8, the trough 31 to ridge 32 natural sag of the draped blank 10 may not give full depth to core. Therefore, as illustrated in FIG. 9, depressors 34, 34A may be interposed in the troughs 31 along the length of the blank between the support rods to insure proper depth dimension between ridge and trough.

Preferably the apparatus of FIG. 7 including the base, supports and depressors is of a heat resistant material such as steel so that the apparatus and the impregnated sheet thereon may be placed in heating apparatus to quickly cure the plastic polymer in controlled fashion to harden the polymer to stabilize the corrugated or sinusoidal configuration of the core. The cross-sectional shape of a cured core 30 is shown in FIG. 10 wherein the two sheets 11 and 12 of the core blank are stable both in their fixed relationship to one another and in the cross-sectional shape.

While the plastic elastomer stripes 19A tend to hold the core to a three dimensional pattern, the basic flexibility of the cloth is inhibited in only one direction, retaining flexibility about lines parallel to the support rods or transverse to the polymer stripes. This flexure is illustrated in FIG. 11 wherein the troughs and ridges of side 36 of the core sheet are seen to be more compacted than the troughs and ridges of opposite side 37 of the core sheet 30. There is some flexibility in the opposite direction between the hardened stripes 19A such that the core may be shaped as desired within the elastic limits of the stripes.

FIG. 12 shows a laminar structure 40 in which a shaped core such as the core 30 has applied to it outer laminates 41, 42. The whole is impregnated and cured for rigidity and strength. Epoxy resins may be used for this impregnation. The outer laminates are shown as two ply plastic sheets, but other cloths, metal or wood laminates may be used, the bonding agents and the impregnant varying with the choice of material.

The physical properties of the inventive product approximate those of metal honeycomb faced with two epoxy impregnated layers of glass cloth.

Tests have provided data as follows:

The specimens in both instances were fiberglass core in accordance with the invention faced with two layers of 7544 glass cloth and filled with epoxy resin.

Similar advantages in strength and lightness and simplicity of fabrication accrue from the products of the process shown in FIGS. 13 and 14. In FIG. 13 a core 51 is shown in transverse cross-section and is comprised of two sheets of fiberglass striped with polymer, draped and depressed for shaping and then cured, as described with respect to the previously set forth embodiments. In the case of the core 51, the undercut configuration requires either split supports and depressors or insertion of depressors from the blank sides like sides 36 or 37. Because of the previously discussed flexibility pattern after curing, core 51 is easily separated from its forming apparatus.

FIG. 14 illustrates a combination of two cores made in accordance with the invention. Each core 55, 56 is identical, but reversed so as to mate one in the other. Thus the sharp ridges 58 of each are in contact with the rounded troughs 59 of each core. Flexibility still is available about lines parallel to the ridges or transverse to the polymer stripes (not shown), but flexibility in the opposite direction is severely limited.

Both core 51 and the combined cores 55, 56 may receive outer laminations in the previously described fashion and result in laminar structures of desired configuration which still have the advantages of light weight and high strength coupled with simple fabricating procedures. Conventional materials are thus uniquely combined in a series of ingenious steps to produce a marked advance in the laminate field.

While other variations than those shown within the scope of the invention may occur to those skilled in the particular art it is believed that the foregoing is a thorough disclosure of the invention. However, it is desired that the scope of the invention be measured by the appended claims rather than by the illustrative disclosure above.

I claim:

1. A process for forming a three dimensional non-rigid core for laminar structures and comprising the steps of applying a heat curable but still liquified hardenable plastic stripe along a length of flexible cloth, applying at least one more plastic stripe along the length of the cloth substantially parallel to the first stripe, suspending the striped cloth on spaced supports such that the cloth intervenes between supports, curing the plastic coated areas, and then shaping the cured cloth with hardened stripes to a desired shape for a core.

2. A process in accordance with claim 1 including the step of fixing two cloth layers together with the hardenable plastic stripes.

3. A process in accordance with claim 1 wherein the supports extend transversely of the stripes.

4. A process in accordance with claim 1 wherein certain areas of the cloth are treated by applying a mask thereto, and exposing other areas to the application of a plastic polymer.

5. A process in accordance with claim 3 including the further step of depressing the cloth between adjacent supports.

\* \* \* \* \*

---

Edgewise flexural strength
18 inch span
Specimen ½" × 2" × 20"
Load in lbs — 250
Flexural strength — 2707 psi
Deflection — .00068 each 10 lbs of load
ASTM D — 790

Edgewise compressive strength
Specimen ½" × 2 × 4"
Load in lbs applied to side: 2500
Compressive strength — 2500 psi
ASTM D — 229